(12) United States Patent
Bartlett et al.

(10) Patent No.: US 8,346,163 B2
(45) Date of Patent: Jan. 1, 2013

(54) RADIO FREQUENCY SIGNAL DISTRIBUTION USING DATA CABLE SYSTEM

(75) Inventors: Allan Bartlett, Newbury (GB); Alan Law, Basingstoke (GB); Toby Proctor, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 529 days.

(21) Appl. No.: 12/309,426

(22) PCT Filed: Jul. 23, 2007

(86) PCT No.: PCT/GB2007/002784
§ 371 (c)(1),
(2), (4) Date: Mar. 10, 2009

(87) PCT Pub. No.: WO2008/009968
PCT Pub. Date: Jan. 24, 2008

(65) Prior Publication Data
US 2009/0247076 A1 Oct. 1, 2009

(30) Foreign Application Priority Data

Jul. 21, 2006 (GB) .................................. 0614543.7

(51) Int. Cl.
H04B 7/155 (2006.01)
(52) U.S. Cl. ............................. 455/20; 327/113; 331/37
(58) Field of Classification Search ..................... 455/20
See application file for complete search history.

(56) References Cited

U.S. PATENT DOCUMENTS

| | | | | |
|---|---|---|---|---|
| 4,455,573 A | * | 6/1984 | Yamamoto et al. | 348/738 |
| 4,592,093 A | * | 5/1986 | Ouchi et al. | 725/69 |
| 4,777,633 A | * | 10/1988 | Fletcher et al. | 370/345 |
| 4,850,038 A | * | 7/1989 | Shibata et al. | 455/315 |
| 5,177,604 A | * | 1/1993 | Martinez | 725/144 |
| 5,214,390 A | * | 5/1993 | Montreuil | 329/309 |
| 5,271,041 A | * | 12/1993 | Montreuil | 375/344 |
| 5,287,351 A | * | 2/1994 | Wall, Jr. | 370/206 |
| 5,392,280 A | * | 2/1995 | Zheng | 370/353 |
| 5,488,412 A | * | 1/1996 | Majeti et al. | 725/111 |
| 5,512,935 A | * | 4/1996 | Majeti et al. | 725/33 |
| 5,532,733 A | * | 7/1996 | Wignot | 725/151 |
| 5,534,913 A | * | 7/1996 | Majeti et al. | 725/114 |
| 5,583,784 A | * | 12/1996 | Kapust et al. | 702/77 |
| 5,608,446 A | * | 3/1997 | Carr et al. | 725/114 |
| 5,640,196 A | * | 6/1997 | Behrens et al. | 348/14.02 |
| 5,765,099 A | | 6/1998 | Georges et al. | |
| 5,768,280 A | * | 6/1998 | Way | 370/486 |
| 5,825,829 A | * | 10/1998 | Borazjani et al. | 375/308 |
| 5,862,137 A | * | 1/1999 | Manning et al. | 370/395.41 |

(Continued)

FOREIGN PATENT DOCUMENTS

EP 0465457 A2 1/1992

(Continued)

*Primary Examiner* — Hai Nguyen
(74) *Attorney, Agent, or Firm* — Muirhead and Saturnelli, LLC

(57) ABSTRACT

A system for distributing radio frequency signals using a data cable system includes a method and components that receive a radio frequency (RF) signal, identify at least one unoccupied channel on the data cable system, convert the RF signal to the frequency associated with an unoccupied channel as a converted signal, insert the converted signal into the cable, extract the converted signal from the cable as an extracted signal, convert the extracted signal to a transmission frequency as a transmission signal, and transmit the transmission signal at the transmission frequency.

11 Claims, 6 Drawing Sheets

U.S. PATENT DOCUMENTS

| | | | | |
|---|---|---|---|---|
| 5,909,427 A * | 6/1999 | Manning et al. | | 370/219 |
| 5,970,386 A * | 10/1999 | Williams | | 725/69 |
| 5,983,070 A | 11/1999 | Georges et al. | | |
| 5,991,308 A * | 11/1999 | Fuhrmann et al. | | 370/395.53 |
| 5,991,800 A * | 11/1999 | Burke et al. | | 725/110 |
| 6,011,579 A * | 1/2000 | Newlin | | 348/14.08 |
| 6,014,546 A * | 1/2000 | Georges et al. | | 725/79 |
| 6,061,434 A * | 5/2000 | Corbett | | 379/93.35 |
| 6,188,871 B1 * | 2/2001 | Kitamura et al. | | 725/120 |
| 6,351,469 B1 * | 2/2002 | Otani et al. | | 370/459 |
| 6,385,434 B1 * | 5/2002 | Chuprun et al. | | 455/11.1 |
| 6,501,942 B1 * | 12/2002 | Weissman et al. | | 455/14 |
| 6,559,898 B1 * | 5/2003 | Citta et al. | | 348/723 |
| 6,594,496 B2 * | 7/2003 | Schwartz | | 455/509 |
| 6,618,432 B1 * | 9/2003 | Ganesh | | 375/147 |
| 6,678,473 B1 * | 1/2004 | Morthier | | 398/56 |
| 6,714,605 B2 * | 3/2004 | Sugar et al. | | 375/340 |
| 6,763,242 B1 * | 7/2004 | Feria et al. | | 455/509 |
| 6,768,901 B1 * | 7/2004 | Osborn et al. | | 455/230 |
| 6,829,479 B1 * | 12/2004 | Chang et al. | | 455/431 |
| 6,850,735 B2 * | 2/2005 | Sugar et al. | | 455/67.11 |
| 6,876,852 B1 * | 4/2005 | Li et al. | | 455/426.2 |
| 6,891,813 B2 * | 5/2005 | Feria et al. | | 370/329 |
| 6,914,557 B2 * | 7/2005 | Chang et al. | | 342/354 |
| 6,941,138 B1 * | 9/2005 | Chang et al. | | 455/427 |
| 6,952,580 B2 * | 10/2005 | Chang et al. | | 455/427 |
| 7,035,593 B2 * | 4/2006 | Miller et al. | | 455/67.11 |
| 7,039,357 B2 * | 5/2006 | Weissman et al. | | 455/16 |
| 7,050,807 B1 * | 5/2006 | Osborn | | 455/445 |
| 7,085,530 B2 * | 8/2006 | Weissman | | 455/7 |
| 7,103,317 B2 * | 9/2006 | Chang et al. | | 455/66.1 |
| 7,110,756 B2 * | 9/2006 | Diener | | 455/423 |
| 7,116,943 B2 * | 10/2006 | Sugar et al. | | 455/67.11 |
| 7,123,169 B2 * | 10/2006 | Farmer et al. | | 340/945 |
| 7,167,704 B2 * | 1/2007 | Chang et al. | | 455/431 |
| 7,167,713 B2 * | 1/2007 | Anderson | | 455/456.1 |
| 7,171,161 B2 * | 1/2007 | Miller | | 455/67.11 |
| 7,174,293 B2 * | 2/2007 | Kenyon et al. | | 704/231 |
| 7,236,765 B2 * | 6/2007 | Bonicatto et al. | | 455/402 |
| 7,376,389 B2 * | 5/2008 | Bassiri et al. | | 455/7 |
| 7,580,346 B2 * | 8/2009 | Azenkot et al. | | 370/208 |
| 7,633,852 B2 * | 12/2009 | Brummette et al. | | 370/208 |
| 7,813,451 B2 * | 10/2010 | Binder et al. | | 375/316 |
| 7,840,989 B2 * | 11/2010 | Bertonis et al. | | 725/118 |
| 2002/0052188 A1 | 5/2002 | Behbahani | | |
| 2002/0103001 A1 * | 8/2002 | Weissman | | 455/524 |
| 2003/0067883 A1 * | 4/2003 | Azenkot et al. | | 370/252 |
| 2003/0112878 A1 * | 6/2003 | Kloper | | 375/259 |
| 2003/0185163 A1 | 10/2003 | Bertonis et al. | | |
| 2004/0010368 A1 * | 1/2004 | Scott | | 701/213 |
| 2004/0072570 A1 * | 4/2004 | Smith | | 455/446 |
| 2004/0131357 A1 * | 7/2004 | Farmer et al. | | 398/67 |
| 2004/0215769 A1 * | 10/2004 | Yoshida et al. | | 709/224 |
| 2005/0226164 A1 * | 10/2005 | Williams | | 370/242 |
| 2005/0229203 A1 * | 10/2005 | Jutzi | | 725/14 |
| 2005/0235333 A1 * | 10/2005 | Bertonis et al. | | 725/111 |
| 2005/0278762 A1 * | 12/2005 | Leddy et al. | | 725/95 |
| 2005/0281321 A1 * | 12/2005 | Bergstrom et al. | | 375/144 |
| 2006/0046642 A1 * | 3/2006 | Bassiri et al. | | 455/7 |
| 2006/0172781 A1 * | 8/2006 | Mohebbi | | 455/571 |
| 2006/0229020 A1 * | 10/2006 | Mlinarsky et al. | | 455/67.14 |
| 2006/0233111 A1 * | 10/2006 | Wright | | 370/241 |
| 2006/0248567 A1 * | 11/2006 | Vanderhoff et al. | | 725/128 |
| 2006/0277181 A1 * | 12/2006 | Temple et al. | | 707/9 |
| 2007/0025421 A1 * | 2/2007 | Shattil | | 375/136 |
| 2007/0121712 A1 * | 5/2007 | Okamoto | | 375/222 |
| 2007/0297320 A1 * | 12/2007 | Brummette et al. | | 370/208 |
| 2007/0297580 A1 * | 12/2007 | Corbett et al. | | 379/93.23 |
| 2008/0022324 A1 * | 1/2008 | Yang et al. | | 725/81 |
| 2008/0046947 A1 * | 2/2008 | Katznelson | | 725/114 |
| 2008/0214175 A1 * | 9/2008 | Papadoglou et al. | | 455/422.1 |
| 2008/0261520 A1 * | 10/2008 | Bassiri et al. | | 455/7 |
| 2009/0270025 A1 * | 10/2009 | Kossi et al. | | 455/3.01 |
| 2009/0323767 A1 | 12/2009 | Bartlett et al. | | |
| 2010/0023972 A1 * | 1/2010 | Summers et al. | | 725/54 |
| 2010/0216488 A1 * | 8/2010 | Markoulidakis | | 455/456.1 |
| 2011/0003580 A1 * | 1/2011 | Belrose et al. | | 455/410 |
| 2011/0121952 A1 * | 5/2011 | Bonicatto et al. | | 340/12.32 |
| 2011/0141375 A1 * | 6/2011 | Yuen et al. | | 348/731 |

FOREIGN PATENT DOCUMENTS

| | | |
|---|---|---|
| GB | 2300549 A | 11/1996 |
| WO | WO 85/05745 | 12/1985 |
| WO | WO94/01941 | 1/1994 |
| WO | WO94/13067 | 6/1994 |
| WO | WO/02/23713 A2 | 3/2002 |

* cited by examiner

RADIO FREQUENCY SIGNAL DISTRIBUTION USING DATA CABLE SYSTEM

The present invention relates to an RF distribution system and, in particular, to a system and method for distributing RF signals using existing cabling.

Typically, mobile phone coverage is provided by transmitting RF signals from basestations. Users' handsets communicate with the network by transmitting signals back to the basestation. A problem faced by mobile phone operators is that certain locations receive a poor quality of reception or, in some cases, no reception at all. These areas of poor reception are generally caused by the RF signals being blocked or attenuated by natural or other obstacles. Examples of areas of poor reception are valleys or other areas in which the natural landscape prevents the penetration of the signals, built up areas in which buildings block the RF signals or within buildings where the general building layout prevent the mobile signals from reaching all parts of the building.

One solution to improving the coverage in areas of poor reception is repeaters. Repeaters are placed around areas of poor coverage but must be in locations where RF signals can be received in order that they can amplify the signals they pick up. Repeaters operate by receiving RF signals from basestations, amplifying the signal and re-transmitting the signal into the area of poor coverage. They also receive signals from handsets in the vicinity of the repeater, amplify these and re-transmit them to the basestation. Although repeaters improve the level of coverage in certain areas their successful operation is entirely reliant on their ability to receive the RF signal from the basestation. Another problem is that they retransmit the signal in vicinity in which it was received and so, although they boost the signal strength, in many cases they cannot fully penetrate areas of poor coverage. A further problem is that feedback between the receiver and the transmitter can cause operational problems and so careful setup of the repeaters is required. These factors increase the installation costs and reduce the ability for repeaters to provide enhanced coverage in many areas.

In a second known solution, RF mobile phone signals are inserted directly into existing cables, for example television cables, within buildings or, on a wider scale, in underground distribution cabling. The RF signals are received from either repeaters in good coverage locations or dedicated basestations and are input into the cable and passed through the cable to transmitters positioned in areas of poor coverage. A problem faced by such systems is that existing cabling includes components, for example amplifiers, which only allow the passage of signals which are within particular frequency ranges. Generally, the frequency of RF mobile phone signals falls outside the frequency range of such amplifiers and so would be filtered by the amplifier which results in data loss. In order to avoid the loss of the RF signals in this situation, the RF signal must bypass the amplifier by being filtered out of the cable before it reaches the amplifier and then reinserted after the amplifier. In practice, in order to avoid RF signal loss, the cable must be accessed at the location of the amplifier and a bypass cable attached on either side of the amplifier which retrieves the RF signal and reinserts it after the amplifier. The bypassing of every amplifier or other potentially filtering component in a pre-installed cable makes installation of bypass components inconvenient and is impractical.

We have appreciated that it is beneficial to carry an RF signal into an area of poor coverage using pre-installed cabling. However, the requirement of physically inserting filters and bypass components on either side of each amplifier or device which would filter the RF signal is impractical for large scale implementation.

Embodiments of the present invention use existing cabling to carry RF signals into areas of poor coverage and avoid having to physically install components to bypass each amplifier. Embodiments of the invention determine the bandwidth which can be carried by the cable and identify unoccupied channels within that bandwidth. Embodiments then convert the RF signals onto a frequency associated with the unoccupied channel. The converted signal is then mixed into the cable. Since the signal is placed onto a channel which is not occupied by other data on the cable, the signal can be carried into areas of poor coverage without interfering with other data carried by the cables. Such embodiments provide the advantage that the RF signals are distributed into the areas of poor coverage without requiring the cable to be accessed at points other than the input and output points. Thus, installation costs are reduced and the compatibility of system with any cable is provided.

In order that the signal can be retrieved from the cable, preferred embodiments of the invention input a second signal into the cable which indicates the channel on which the RF signals are positioned. In preferred embodiments, this second signal is a spread signal of low magnitude which can be received at the point at which the RF signal is extracted. Once the extracting apparatus has identified on which channel the signal is carried it can set its filters to extract the correct channel.

The invention is defined in its various aspects in the claims to which reference should now be made.

A preferred embodiment of the invention is now described with reference to the accompanying figures, in which.

Figure 1:
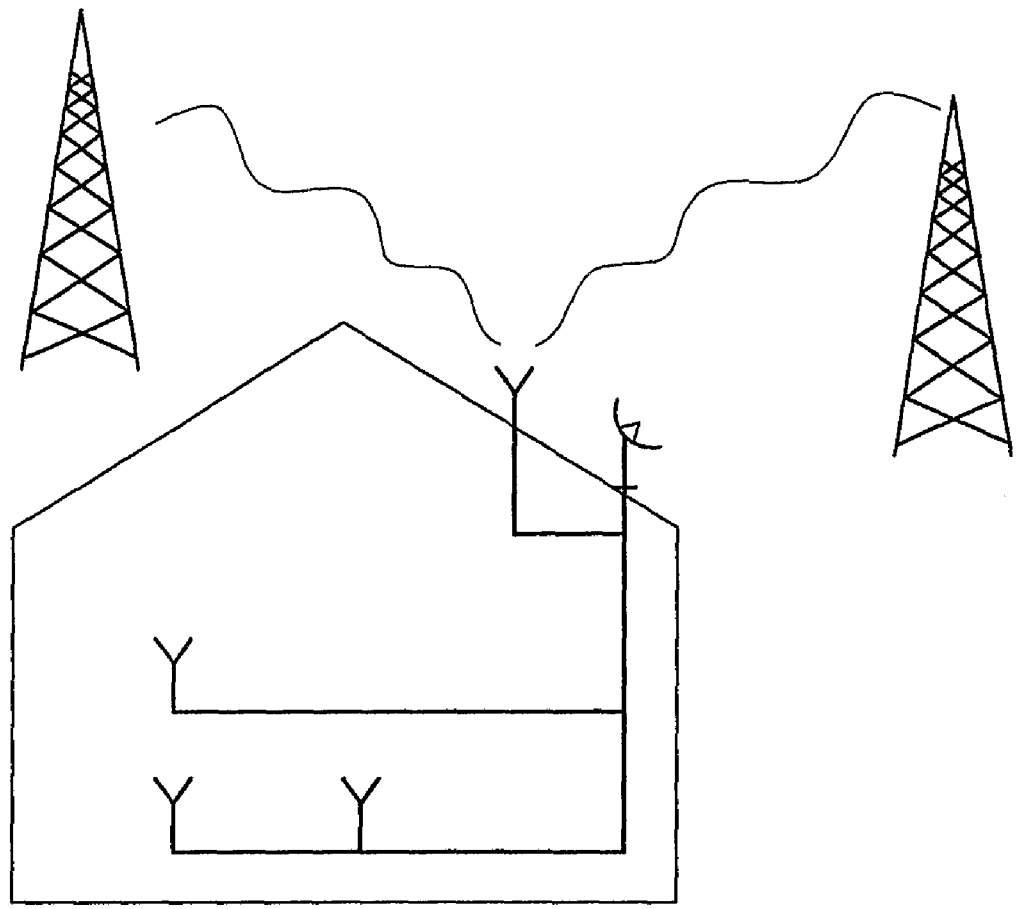
FIG. 1 shows a building having digital television cabling and having an antenna for receiving mobile telecommunication signals.

FIG. 1 shows a building which is located in an area of RF coverage. In the example of FIG. 1 RF coverage is mobile telecommunication coverage which is provided by network of base stations. The walls, windows, floors etc of the building cause attenuation of the RF signal and so areas within the building will experience poor or no RF coverage. The building of FIG. 1 includes a cabling infrastructure to carry digital television signals into the different rooms.

In the embodiment of FIG. 1, RF signals are received in an area of coverage, inserted into the digital TV cabling and distributed around the building to provide improved RF coverage throughout the building.

Figure 2:
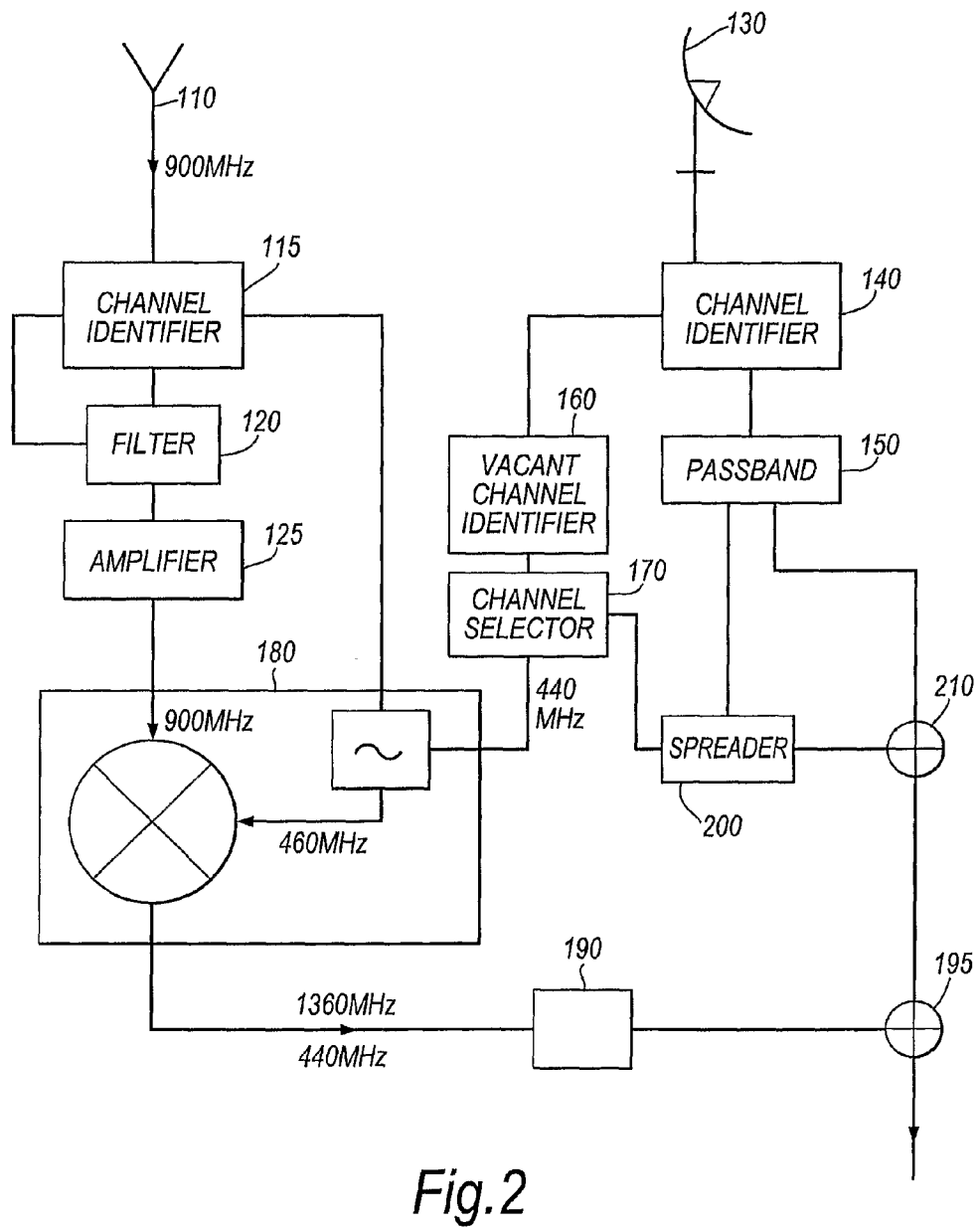
FIG. 2 is a block diagram showing the components for receiving a communication system and inserting the signal into cabling. For simplicity only the downlink (DL) path is shown, the uplink (UL) has the elements in reverse.

FIG. 2 shows the components and the connections between components in the building shown in FIG. 1 in which digital television cabling within the building is used to distribute RF signals. RF signals 100 are received by an RF receiver 110. The receiver should be positioned in an area of RF coverage, typically on the roof or on an outside wall of the building. In the example of FIG. 2 the RF receiver is tuned to receive over the air 2G mobile telecommunications signals, in the frequency range of around 900 MHz. However, in alternative embodiments, the RF receiver would be suitable for receiving, or tuned to, different RF frequencies which are desired to be received. In preferred embodiments of the invention the receiver is incorporated into an existing aerial or satellite receiver. It is not essential that the receiver is incorporated into existing devices and, instead, the receiver could be an entirely separate device.

In alternative embodiments a dedicated basestation could be used to supply the RF signal. Additionally, the RF signal need not be received by an over the air receiver but, instead, could be provided by a wired connection directly from the network.

After reception, the frequency (channel) of the incoming signal is identified at a channel identifier 115. The RF signal may then be filtered and/or amplified using a standard filter and amplification system 120/125. The filter may receive an indication of the signal channel from the channel identifier and automatically tune to the channel of the incoming RF signal.

Digital signals are received at the building by receiver 130. In the embodiment shown in FIG. 2, these signals are received over the air, for example from a satellite television network, and placed onto the digital television cabling. In further embodiments, the television signals may be placed onto the cabling directly from an internal source. For example, a hotel may run movie channels from an internal source. In further embodiments, different types of data may be carried on certain channels of the cable or a combination of data types may be carried along the cable. The embodiment includes a channel identifier 140 which determines which channels are occupied, whether by television signals or other data signals.

The system also includes a means for determining the full data carrying bandwidth of the cabling system (passband measurer 150). Cable infrastructures often include components, for example amplifiers, which have a limited bandwidth compared with the bandwidth of the cable. Therefore, the usable bandwidth of the cable is limited by these components since such components will filter out any signals having a frequency outside their bandwidth. For example, cables used to carry digital television signals typically have a bandwidth of 0-2400 MHz. However, often, such cables include amplifiers which only allow signals to pass if they have frequency between 40-900 MHz. Therefore, any signal to be passed along the cable must be in the frequency range of 40-900 MHz. Signals outside this frequency range will be filtered by the amplifiers. In this embodiment, the RF signal must be put on a channel within the frequency range 40-900 MHz since signals outside these limits will be filtered by the amplifiers. This allowed frequency range which can be carried, unfiltered, by the cabling system is known as the passband.

The passband may be known and maintained for a particular cable infrastructure, however, to account for situations in which the cable infrastructure is updated during its lifetime, preferred embodiments include a facility for measuring the passband of the cable infrastructure at periodic time intervals.

The system uses the data from the channel identifier along with the known passband of the cabling system to identify channels which can be carried by the cabling system without being filtered (i.e. the passband) and are not already occupied by data. These channels are identified by the vacant channel identifier 160. A vacant channel is then selected for carrying the RF signal by channel selector 170.

An up/down converter 180 is used to put the RF signals onto the selected vacant channels. In preferred embodiments, the up/down converter is a frequency modulation system used to convert the RF signal onto the vacant channel. The channel identifier 115 informs the frequency modulator of the frequency of the RF signal and the channel selector 170 informs the frequency modulator of the channel on which the RF signal should be placed. The frequency modulator then selects a signal of an appropriate frequency to mix with the RF signal in order to put the signal on the selected channel. In typical frequency modulation systems, input signals $f1$ and $f2$ result in output signals at frequencies $(f1+f2)$ and $(f1-f2)$. The unwanted output signal is then filtered out by filter 190.

For example, in FIG. 2, if the incoming RF signal is at a frequency of 900 MHz and the channel selector selects that the channel for the RF data should be 440 MHz, the frequency modulator could generate a 460 MHz signal to mix with the 900 MHz signal to produce a 1360 MHz signal and a 440 MHz signal carrying the RF data. The 1360 MHz signal is then filtered out to leave the desired 440 MHz signal.

The RF signal on the selected channel is then inserted onto the cable carrying the digital television signals. In preferred embodiments of the invention a mixer 195 is used to insert the signal onto the cable. Once the signal is inserted into the cable it is distributed throughout the building and can be extracted at any suitable point along the cable.

During use the channels occupied by digital television data or other data on the cable may change. Therefore, it is possible that a channel which was identified as vacant and selected to carry the RF signal data may become occupied by data channel (for example a digital television channel) at some time after it has commenced carrying the RF signal. In such a situation, the RF and television signals would be on the same channel and would interfere with one another. Preferred embodiments of the invention periodically monitor which channels are occupied by other data, for example television signals, in case these coincide with an RF channel and cause interference. In the case that the system receives data on the channel currently being used to carry RF data, the system identifies other vacant channels and converts the data onto a chosen different, and vacant, channel.

Preferred embodiments of the invention provide an identification of on which channels the RF signals are placed in order that these channels can be extracted from the cable for transmission. In the specific embodiment of FIG. 1 this channel identification data is included in a spread signal which is also input into the cable. The data is spread using a spreader 200 and the spread signal is then input into the cable using mixer 210. Preferably the spread signal should be of low magnitude, and more preferably, as low magnitude as possible, since the lower the magnitude, the lower the interference with the other data on the cable. The spreader is connected to the channel selector in order that it is informed of on which channel the RF signal will be carried and can then send this channel identification in a spread signal. Preferred embodiments spread the signal across the full passband of the cable system. In embodiments in which the passband of the cable is actively measured, there is a connection between the passband measurer 150 and the spreader in order that the spreader is provided an up to date confirmation of the frequency range over which the channel ID signal should be spread.

In further embodiments alternative methods are used for indicating the channels on which the RF signal is placed, for example the channel identification may be inserted into the cable in a different type of signal or may be communicated to a signal extractor in a different way, for example via a dedicated wired link or via a wireless connection.

Figure 3:
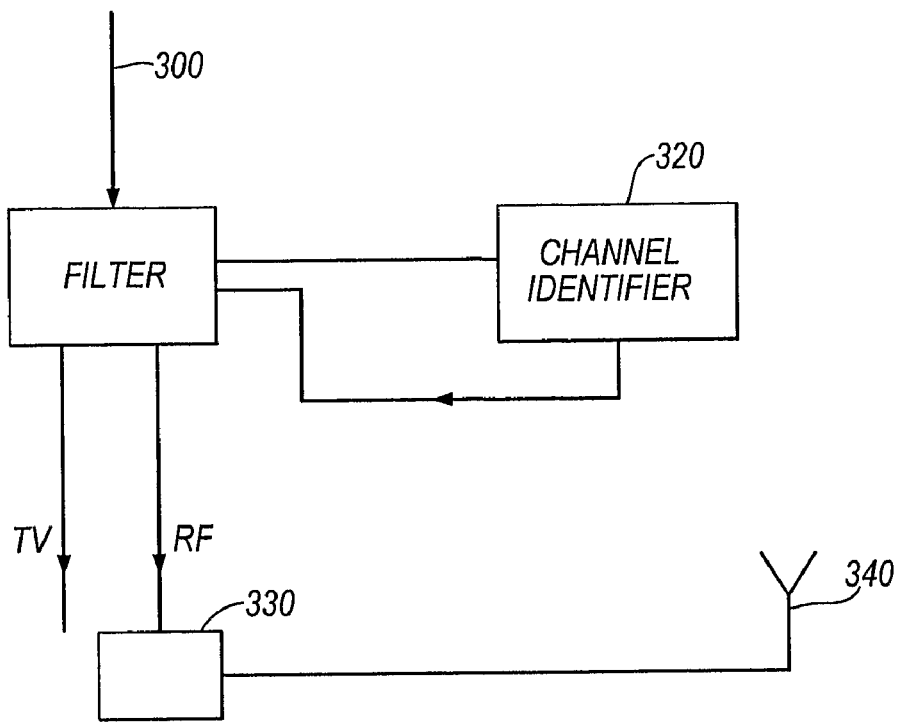
FIG. 3 is a block diagram of the elements used to extract a signal from a cable.

FIG. 3 shows the components required to extract the RF signal from the cable and transmit the extracted signal within an area which would otherwise provide poor RF coverage. The cable carries data 300 including digital television data, RF signals and the spread signal identifying the channels on which the RF signals are located (as discussed above, the channel identification may be transmitted in an alternative way to the spread signal). Preferred embodiments use a filter 310 to extract the spread signal identifying the channels on which the RF signal is carried. This signal is then despread and a channel identifier 320 identifies the channels on which the RF signal is being carried. The channel identifier forwards this information to a filter, which may be filter 310 or a separate filter. The channels carrying the RF data are extracted in such a way that other data on the cable, for example, television data, is not affected. Further embodiments in which the channel identification is not included in a spread signal do not extract a spread signal to identify the channels but, instead, receive confirmation of the RF channels by other means. In one embodiment, a wireless connection is set up between the channel selector at the signal insertion point and the channel identifier at the extraction point and identification of the channel carrying the RF data is transmitted across the wireless link. In further embodiments a wired connection may be made between the channel selector at the insertion end and the channel identifier at the extraction end.

Once the channels have been extracted they are demodulated by demodulator 330 and transmitted by transmitter 340. Typically the transmitter will be chosen to have a suitable power and size to provide coverage within the desired area, for example the room or building.

The RF signal can be extracted at any convenient position along the length of the cable and the transmitter should be placed in a position suitable for providing RF coverage in an area of poor reception.

Figure 4:
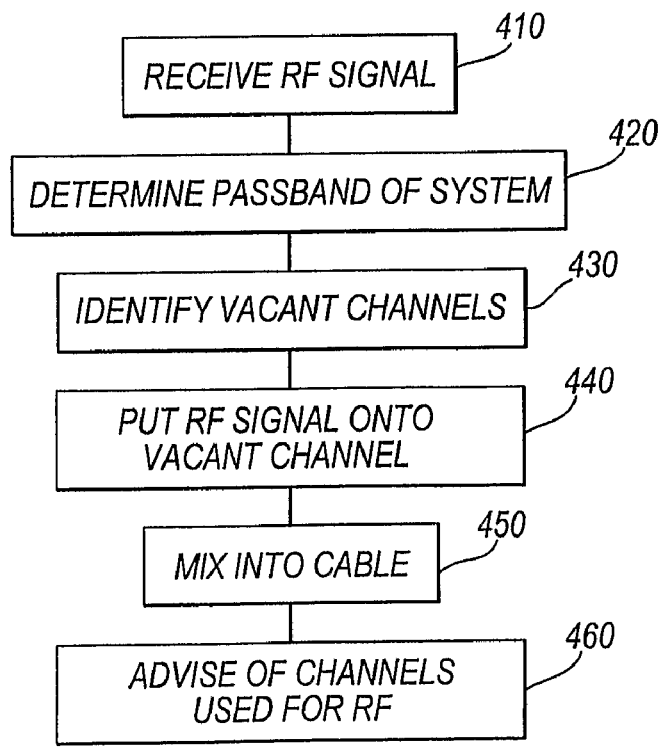
FIG. 4 is a flow diagram showing the steps taken when receiving an RF signal and mixing it into a cable.

FIG. 4 is a flow diagram describing the method steps taken in order to receive the RF signal and insert it into the cable. At 410 the RF signal is received by a receiver. The system should then determine the passband of the cable infrastructure at 420 and determine which of the available channels are not being used to carry data at 430. Embodiments of the invention may perform these steps in parallel.

At 440 the received RF signal is converted to a channel not occupied to data. The signal is then mixed into the cable at 450. At 460 the system transmits data indicating the channels on which the RF signal is carried. In preferred embodiments the indication data is transmitted as a spread signal within the cable.

Figure 5:
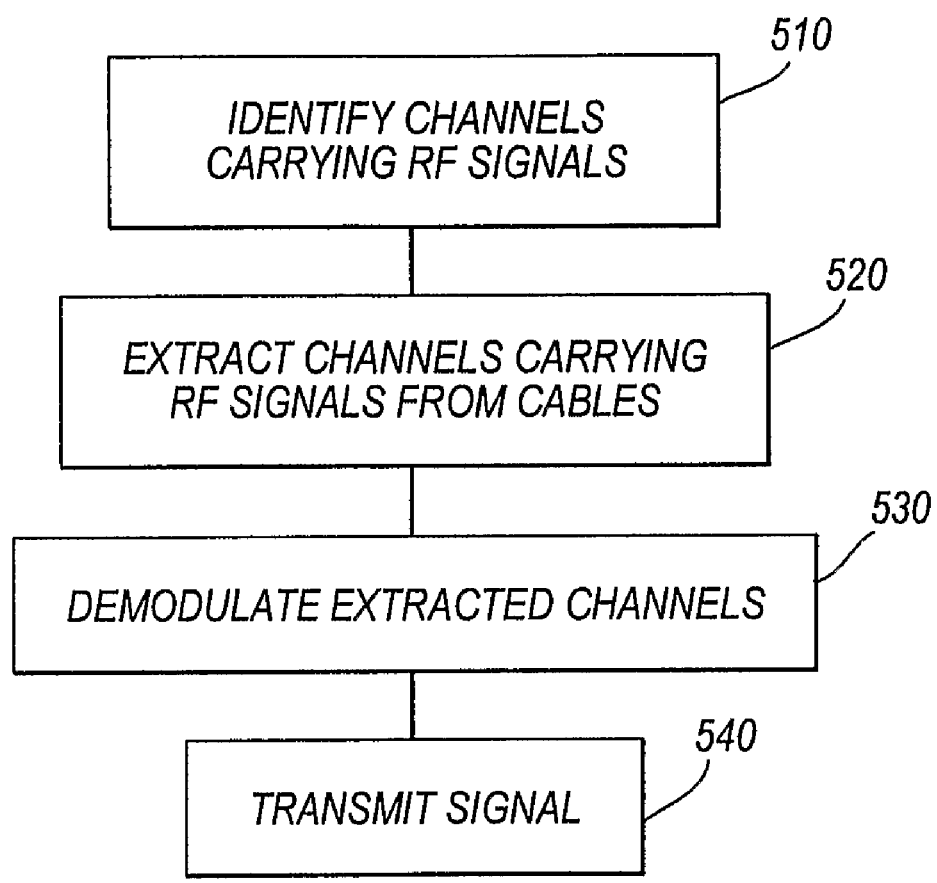
FIG. 5 is a flow diagram showing the steps taken when extracting an RF signal from a cable.

FIG. 5 is a flow diagram showing the steps taken to extract the RF channels from a cable carrying the RF data and to transmit the extracted RF signal. At 510 the channel identifier receives an identification of any channels which are carrying the RF signals. This identification can be received by data within the cable or by data received from other means. At 520 the system extracts the channels carrying the RF signals by tuning the extractor to the frequency of the channel carrying the RF signals. The extracted signals are demodulated at 530 and transmitted at 540.

Figure 6:
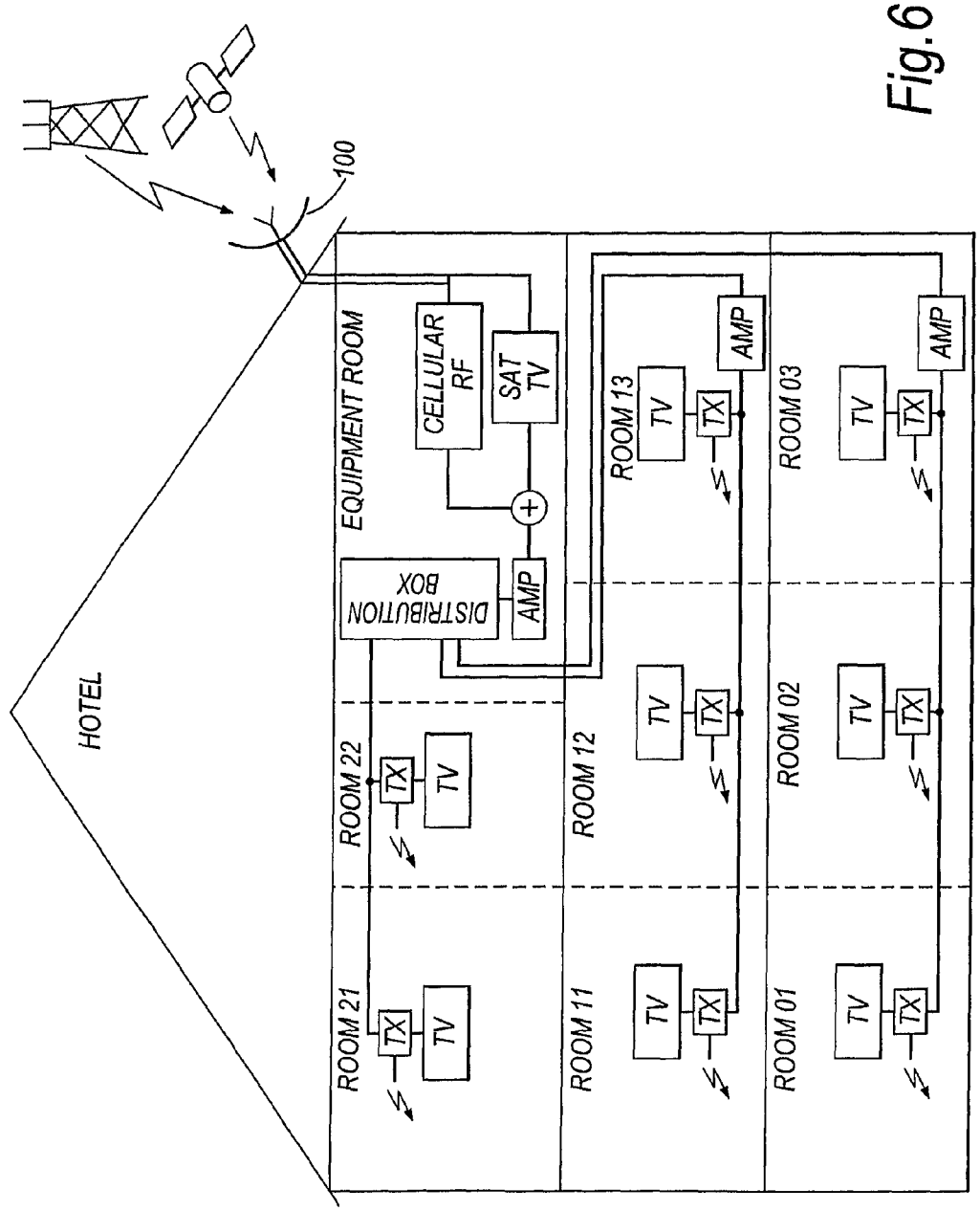
FIG. 6 shows an embodiment of the invention installed into a building.

FIG. 6 shows a practical implementation of an embodiment of the invention which provides RF coverage within a building which is located in an area of RF coverage but in which areas within the building experience poor RF coverage. The poor signal coverage within the building may be due to attenuation of the signals by, for example, walls, doors and floors. In the example of FIG. 6, the building is a hotel in which television cabling is installed and distributed throughout the building. Digital television cabling is particularly useful for distributing RF in existing buildings since it is often laid throughout a building and directed into many different rooms or areas of the building. The distributed cabling provides the potential for transmitters to be put in many different locations throughout the building in order to produce widespread coverage. In the example of a hotel which has many rooms, the digital television cabling within the hotel is split at several points in order that each room is provided with digital television coverage. In such cases, it would be possible to have separate RF signal mixers, despreaders, digital to analogue converters and transmitters in several of the rooms in order to provide RF coverage in those rooms and, therefore, throughout the hotel. Thus, each room has an RF transmitter (TX). However, in many situations, acceptable coverage can be provided throughout the building without requiring a transmitter in every room.

Whilst it is essential that systems incorporating the invention can provide improved network coverage, a mobile device is only able to communicate with a network if it is able to both receive signals from the network (i.e. in the downlink direction) and transmit signals back to the network (i.e. in the uplink direction). In mobile communication systems, communications between basestations and mobile devices are typically carried directly over the air and, therefore, an area of poor network coverage is, typically, also an area in which a device cannot successfully transmit signals to reach a basestation. Preferred systems incorporating the invention also enable signals from devices which are positioned in areas of naturally poor coverage to reach basestations. Preferred systems achieve this by positioning receivers in the vicinity of the transmitters in areas of poor coverage. The receivers receive signals transmitted from the mobile devices. These signals are inserted into the cabling on vacant channels in the same way as the downlink signals from the basestations. The signals are then carried to an area of good RF coverage where they are extracted, converted and transmitted back to the basestation. Such receivers may be co-located with the transmitters or may be located, and provide entry into the cabling, at a separate point. Preferred embodiments of the invention provide a single unit which can transmit and receive RF signals and input and extract these signals from a cable. In the embodiment of FIG. 6, each room containing a signal extractor and transmitter would also include a receiver and signal inserter to mix the uplink signal into the cable. Additionally, the main signal insertion unit for inserting signals received from the base station into the cable will also include a signal extractor and transmitter.

Any system which carries both uplink and downlink signals requires a bidirectional signal carrying capability. Typically, particular types of cabling, for example cabling installed for digital television use is designed to carry data which is predominantly unidirectional, since the majority of traffic in a digital television system will be in the downlink direction. While the cable itself is capable of carrying signals in either direction, the components placed along the cable may prevent the flow of data in one direction. For example, some amplifiers may only allow downlink traffic or allow uplink traffic within a limited frequency range. Therefore, the passband may be different between the uplink and downlink directions on a single cable. Thus, preferred embodiments of the present invention identify channels which are vacant and within the passband in the particular direction in which the signal will be carried.

Figure 7:
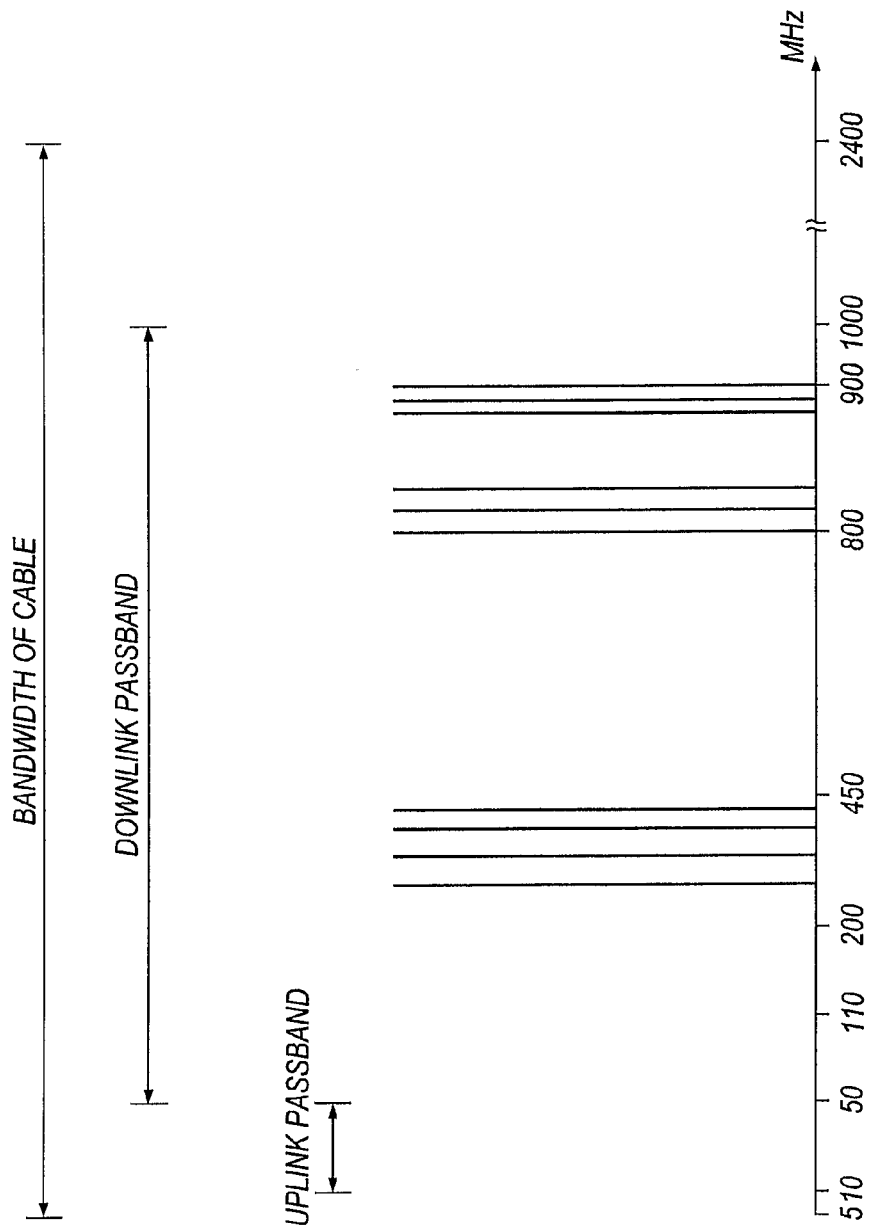
FIG. 7 shows the passband and occupied channels on a cable.

FIG. 7 shows an example of the channel distribution within a cable carrying digital television signals on a plurality of channels. The figure represents a cable which is able to carry signals of frequency between 0-2400 MHz. However, the cabling infrastructure includes multiple components along the cable, for example amplifiers, which result in a reduced signal bandwidth, between 50-900 MHz for the forward path or Downlink (DL) and 5-40 MHz for the return path or Uplink (UL). Within that range, several channels are already occupied by digital television channels. In the example of FIG. 6 the frequencies of 450-800 MHz are not occupied and, therefore, are available for carrying signals in the downlink direction, the channels 5-40 MHz are also vacant and are available for uplink traffic. Thus, embodiments of the invention could put the RF signals onto channels within these frequency ranges without causing interference with the television channels.

Preferred embodiments of the invention provide a method and apparatus for RF distribution which can be implemented into pre-installed cabling in order to provide improved coverage in areas around the cabling. It can be implemented on a large industrial scale to provide geographical areas with improved RF coverage or on a smaller and domestic scale to improve RF coverage within buildings. Preferably, the system can be implemented by providing a pair of units which include a transmitter and receiver, spreader and despreader and digital-to-analogue and analogue-to-digital converters which can be attached to existing cabling in an area of good RF reception and in a poor RF reception area.

In preferred embodiments of the invention, the system for receiving and transmitting RF and inputting and extracting the signal from the cable is incorporated into an existing piece of hardware, for example a set top box. Thus a customer can use a device which is commonly used to provide improved RF coverage.

The specific example described above uses the digital television cabling within a building to improve RF coverage. However, any cable suitable for carrying data can be used. High capacity cables such as fibre optic or co-axial are obvious choices due to their data carrying capacity but any other type of cable can be used, for example telephone, copper, cables if the system has lower capacity requirements.

The specific embodiments described above relate to the distribution of RF mobile phone signals. However, embodiments of the invention are not limited to the distribution of mobile phone signals but can be used to distribute any type of signal.

Additionally, embodiments of the invention can be used to distribute RF or other signals in a purely internal environment which is linked by a cable infrastructure. For example, in an office building the invention could be used use to direct internal calls around the building. Such an internal system would not need to receive or transmit the internal calls externally from the building or other internal environment. Thus the network for internal calls would not need to access the external telecommunications network.

Embodiments of the invention provide a solution to improving RF coverage which does not require complicated installation or extraction of existing cabling at multiple points. Such embodiments provide a cheap and easy to install system to improve RF coverage.

The invention claimed is:

1. A method for distributing radio frequency signals using a data cable system, comprising:
   receiving a radio frequency (RF) signal;
   identifying at least one unoccupied channel on the data cable system;
   identifying a passband of the data cable system, wherein the at least one unoccupied channel is selected within the passband;
   converting the RF signal to a frequency associated with the at least one unoccupied channel as a converted signal;
   inserting the converted signal into a cable of the data cable system;
   indicating the frequency of the converted signal, wherein indicating the frequency of the converted signal is performed by inserting a spread signal into the cable, the spread signal providing the channel identification data for the frequency associated with the at least on unoccupied channel on which the converted signal is placed, wherein the spread signal is spread across at least a portion of the passband;
   extracting, using the channel identification data in the spread signal, the converted signal from the cable as an extracted signal;
   converting the extracted signal to a transmission frequency as a transmission signal; and,
   transmitting the transmission signal at the transmission frequency.

2. The method for distributing RF signals according to claim 1, wherein the step of identifying at least one unoccupied channel is performed periodically.

3. The method for distributing RF signals according to claim 1, wherein the spread signal is spread across the full passband.

4. The method for distributing RF signals according to claim 1, wherein the spread signal is a low rate spread spectrum signal.

5. The method for distributing RF signals according to claim 1, wherein the RF signals are telecommunications signals.

6. An apparatus for distributing radio frequency signals using a data cable system, comprising:
   a receiver that receives a radio frequency (RF) signal;
   a channel identifier that identifies at least one unoccupied channel on the data cable system;
   a passband identifier that identifies a passband of the data cable system, wherein the at least one unoccupied channel is identified within the passband;
   a converter that converts the RF signal to a frequency associated with the at least one unoccupied channel as a converted signal;
   a first insertion unit that inserts the converted signal into a cable;
   a spreader that generates a spread signal that includes channel identification data indicating the frequency of the converted signal;
   a second insertion unit that inserts the spread signal into the cable, the spread signal providing the channel identification data for the frequency associated with the at least one unoccupied channel on which the converted signal is placed, wherein the spread signal is spread across at least a portion of the passband;
   an extractor that, using the channel identification data in the spread signal, extracts the converted signal from the cable as an extracted signal;
   a transmission converter that converts the extracted signal to a transmission frequency as a transmission signal; and,
   a transmitter that transmits the transmission signal at the transmission frequency.

7. The apparatus for distributing RF signals according to claim 6, wherein the first insertion unit periodically inserts the converted signal into the cable.

8. The apparatus for distributing RF signals according to claim 6, wherein the spread signal is spread across the full passband.

9. The apparatus for distributing RF signals according to claim 6, wherein the spread signal is a low rate spread spectrum signal.

10. The apparatus for distributing RF signals according to claim 6, wherein the RF signals are telecommunications signals.

11. The apparatus for distributing RF signals according to claim 6, wherein the channel identifier periodically identifies the at least one unoccupied channel.

\* \* \* \* \*